March 18, 1924.

W. G. HAWLEY 1,487,563

DOUBLE REDUCTION AXLE FOR MOTOR TRUCKS

Filed Oct. 12, 1922     4 Sheets-Sheet 4

INVENTOR
William G. Hawley
BY Knight Bros.
ATTORNEYS

Patented Mar. 18, 1924.

1,487,563

UNITED STATES PATENT OFFICE.

WILLIAM G. HAWLEY, OF ELMIRA, NEW YORK.

DOUBLE-REDUCTION AXLE FOR MOTOR TRUCKS.

Application filed October 12, 1922. Serial No. 594,143.

*To all whom it may concern:*

Be it known that I, WILLIAM G. HAWLEY, a citizen of the United States, residing in the city of Elmira, county of Chemung, and State of New York, have invented certain new and useful Improvements in Double-Reduction Axles for Motor Trucks, of which the following is a specification.

Double reduction axles for motor trucks comprise in general three housings, namely, a main axle housing for the differential gear, jack-shaft housing and a pinion shaft housing, the three housings being secured together with machined joints so as to form one complete oil-tight casing. It has been customary to bore right through the jack-shaft housing for the bearings of the jack-shaft, the orifices in the casing being then closed with flanged covers bolted to the casing thus involving the use of two oil-tight joints resulting in the usual amount of care in keeping them oil-tight. My invention is designed to do away with these extra joints and for this purpose, while I have orifices in the side of the jack-shaft housing for the introduction of the boring bar in the process of boring the jack-shaft bearing supports, I finally fill them permanently by expanding therein tight fitting plugs so that there is no longer any necessity in maintaining two of the oil-tight joints.

In the accompanying drawings Fig. 1 represents a longitudinal vertical section in the center of the double reduction axle;

Figure 1:
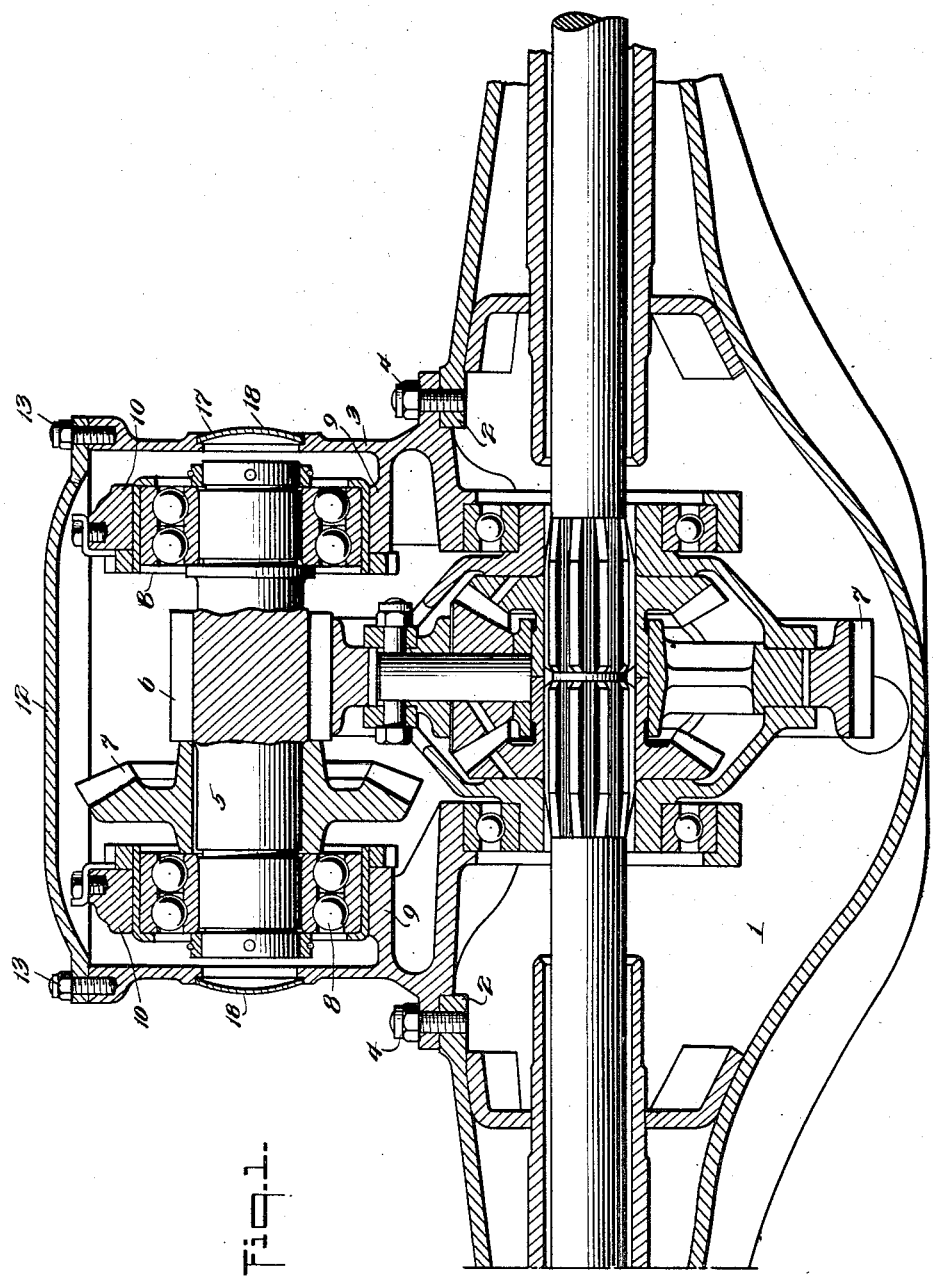

In the drawings 1 is the differential gear housing section and axle, the upper part of which has a flanged opening at 2 and seated upon the flange of this opening is the jack-shaft housing section 3, the two being secured together in the usual way by stud-bolts 4. The jack-shaft 5 carrying the usual spur pinion 6 and bevel wheel 7 is mounted in ball bearings 8 which in turn are carried by bearing supports 9, the latter having removable caps 10 held by bearing cap bolts 11. A cover plate 12 is fitted with an oil-tight joint to the top of the housing section 3 and secured thereto by bolts 13. The front part of the housing section 3 has an opening, against the flanges of which is fitted the pinion shaft casing 14 in which are mounted the ball bearings 15 which form the bearings for pinion driving shaft 16. Said pinion-driving shaft is supported and journalled entirely by said pinion shaft casing. In each side of the jack-shaft housing section 3 there is an opening 17 made just large enough to admit of the boring bar for boring the jack-shaft bearing supports and upon completion of the machine work these openings have plugs 18 permanently fastened therein preferably by expanding the same tightly into the recessed hole, and as the cover plate 12 is made large enough to allow of the withdrawal of the jack-shaft in that direction, there is no need of having end plates secured by bolts with the oil-tight joints as has been the custom heretofore.

A double reduction axle is by this means produced, which has only three joints to be kept oil-tight, namely, the joint between the main housing and the jack-shaft housing, the joint between the jack-shaft housing and the pinion shaft housing and the joint of the cover plate. As every joint means a certain amount of maintenance expense as well as manufacturing expense the advantages of the above construction will be obvious.

Figure 2:
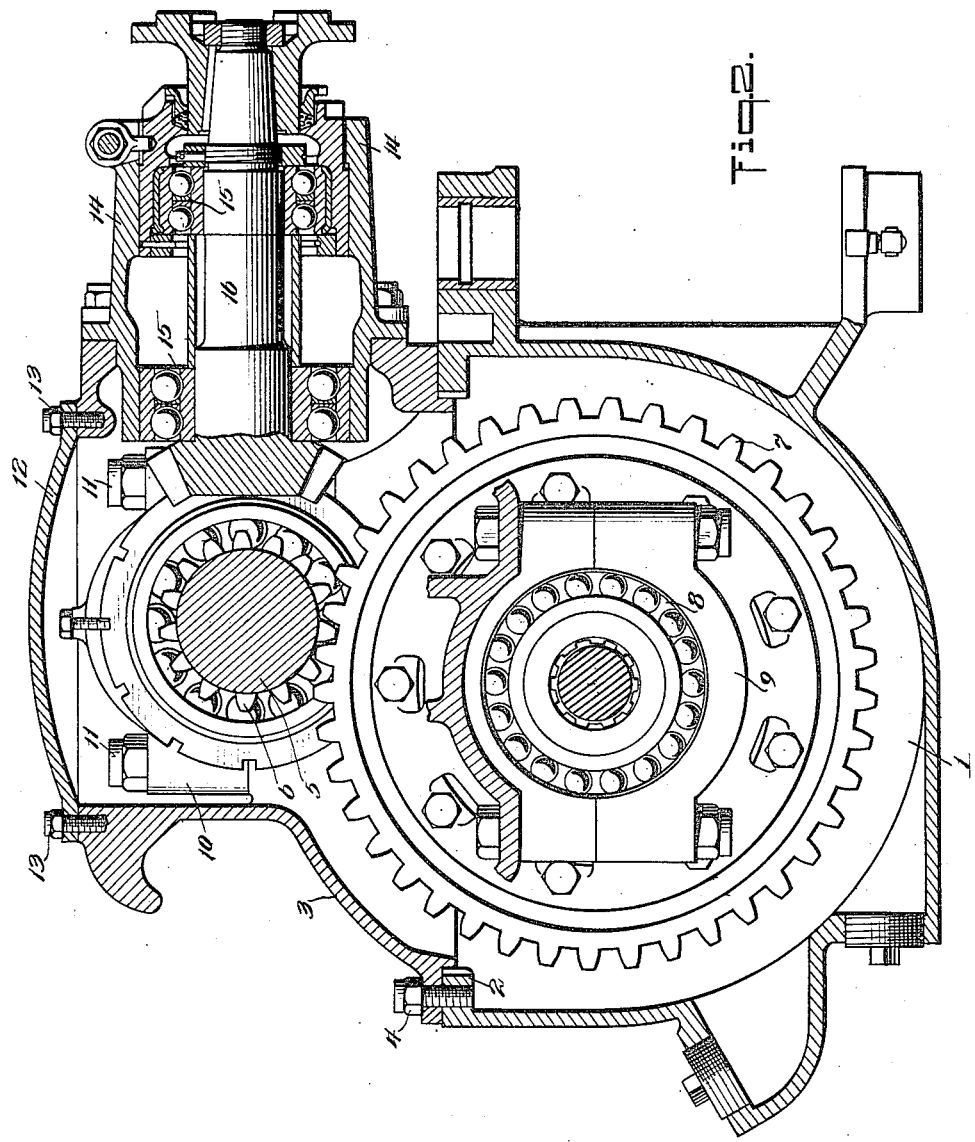
Fig. 2 is a vertical section through the center of the driving shaft.
Figure 3:
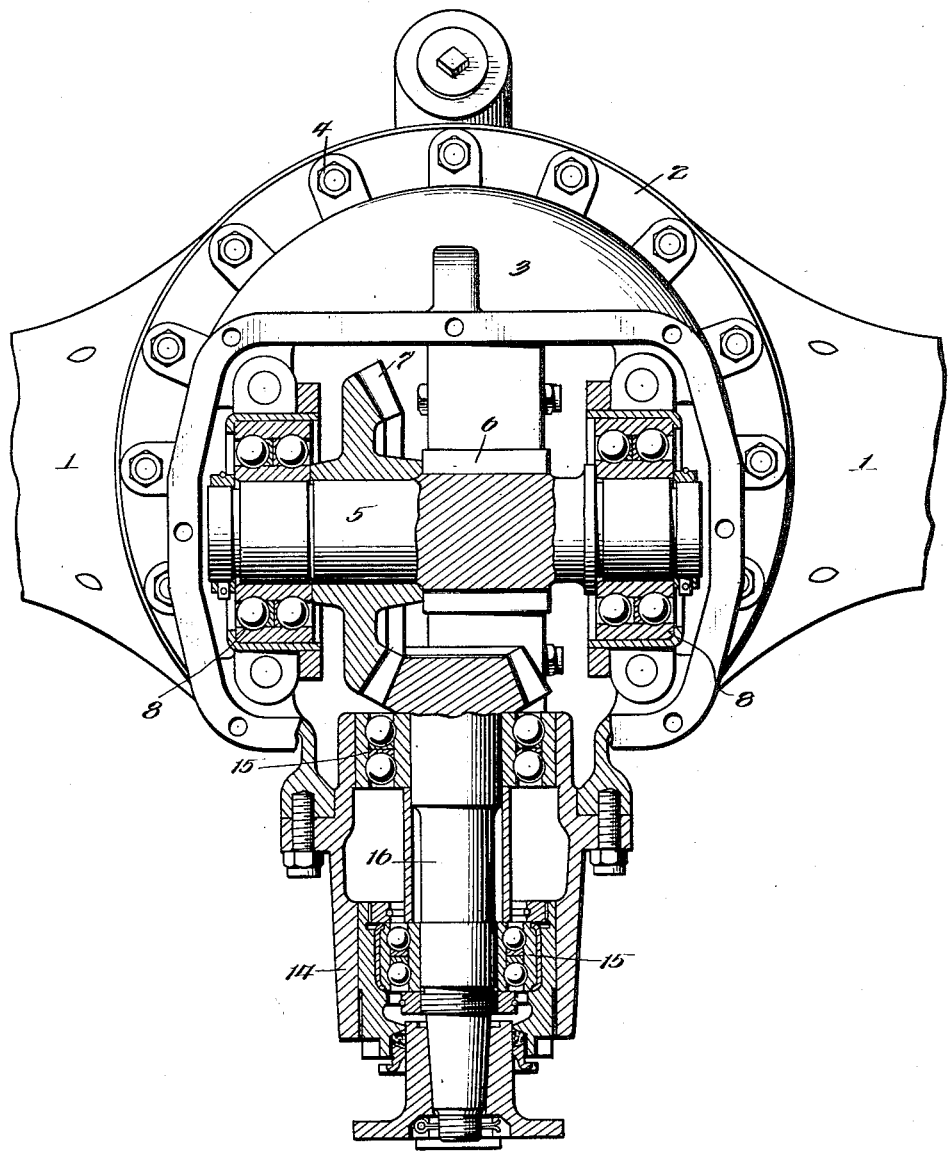
Fig. 3 is a horizontal section through the plane of the driving and jack-shafts.
Figure 5:
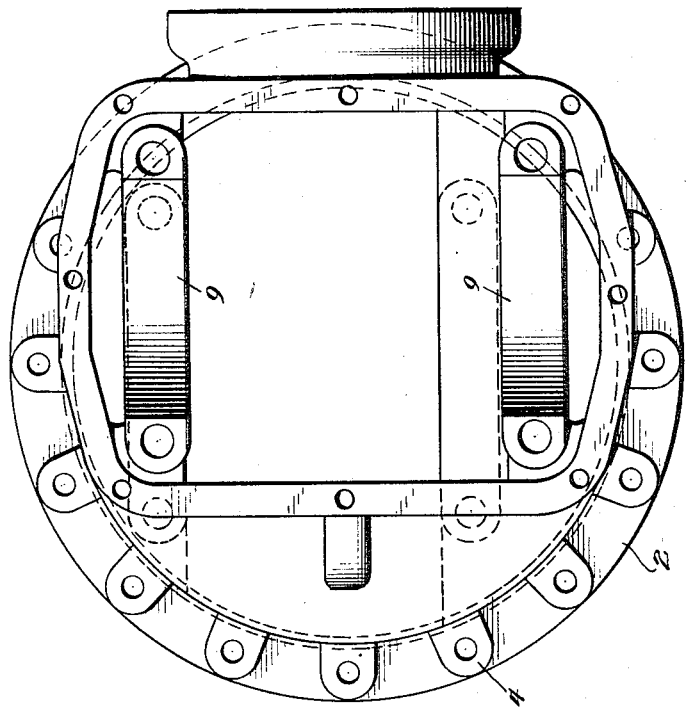
Fig. 5 is a plan view of the jack-shaft housing.
Figure 4:
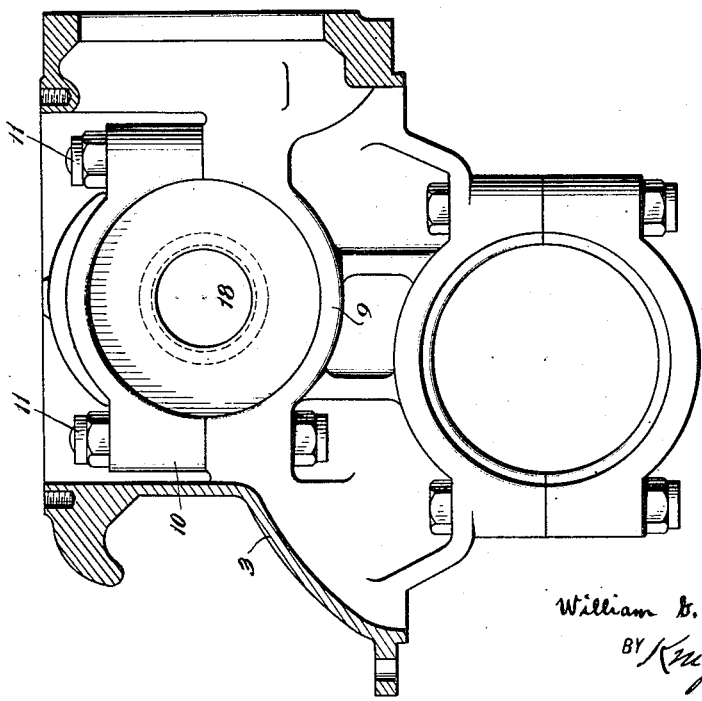
Fig. 4 is a detail view showing a section in the same plane as Fig. 2 of the jack-shaft housing.

By an inspection of Figures 2 and 3, it will be understood that the pinion shaft casing 14 together with the bearings 15, 15, and the pinion driving shaft journalled thereby, may be removed as a unit from the jack-shaft housing 3.

I claim:—

1. A double reduction gear housing for driving axles of motor vehicles comprising the main axle housing, a jack-shaft housing secured thereto and having jack-shaft bearings and side orifices aligning with the jack-shaft bearings for the introduction of the boring bar, said orifices being permanently sealed after the boring with suitable plugs.

2. A double reduction gear housing for driving axles of motor vehicles comprising an axle housing, a jack-shaft housing mounted thereon and secured thereto bearings for said jack-shaft, orifices in the side of the jack-shaft housing only large enough to admit of a boring bar and smaller than the bearings for said jack-shaft and plugs or covers permanently sealed in said orifices.

3. In an automobile transmission, the combination with a differential mechanism, of a power-driven jack shaft geared to said differential, axially spaced bearings for said jack shaft, a housing for said differential and power-driven jack shaft, and supports for said jack shaft bearings mounted within said housing for spacing said bearings from the walls of said housing, said housing being provided with an opening permitting the introduction of a boring bar for boring said jack shaft bearing supports and with a permanent closure for said opening after the boring bar has been withdrawn.

4. In an automobile transmission, the combination with a differential mechanism, of a jack-shaft mechanism, a pinion drive mechanism, and a housing comprising a differential housing section, a jack-shaft mechanism housing section, and a casing for said pinion drive mechanism, jack-shaft bearings within and spaced from the walls of said jack-shaft housing section, bearing supports for said jack-shaft bearings, said jack-shaft housing section being provided with an opening for the introduction of a boring bar for boring said bearing supports, and means for closing said opening after the boring bar has been withdrawn.

5. A double reduction gear housing for the driving axles of motor vehicles including a jack-shaft housing section provided with jack-shaft bearings contained within said housing section and an opening for the introduction of a boring bar for boring said bearings and a closure for said opening.

6. In an automobile transmission, the combination of a differential mechanism, a power-driven jack-shaft geared thereto, bearings for said jack-shaft, a housing for the jack-shaft, said jack-shaft terminating short of the walls of said housing at both ends, and means carried by said housing for supporting said jack-shaft bearings, said housing being provided with boring shaft openings to permit the introduction of a boring bar for boring said supports and plugs for permanently closing said openings after the boring bar has been withdrawn.

WILLIAM G. HAWLEY.